Figure 1:
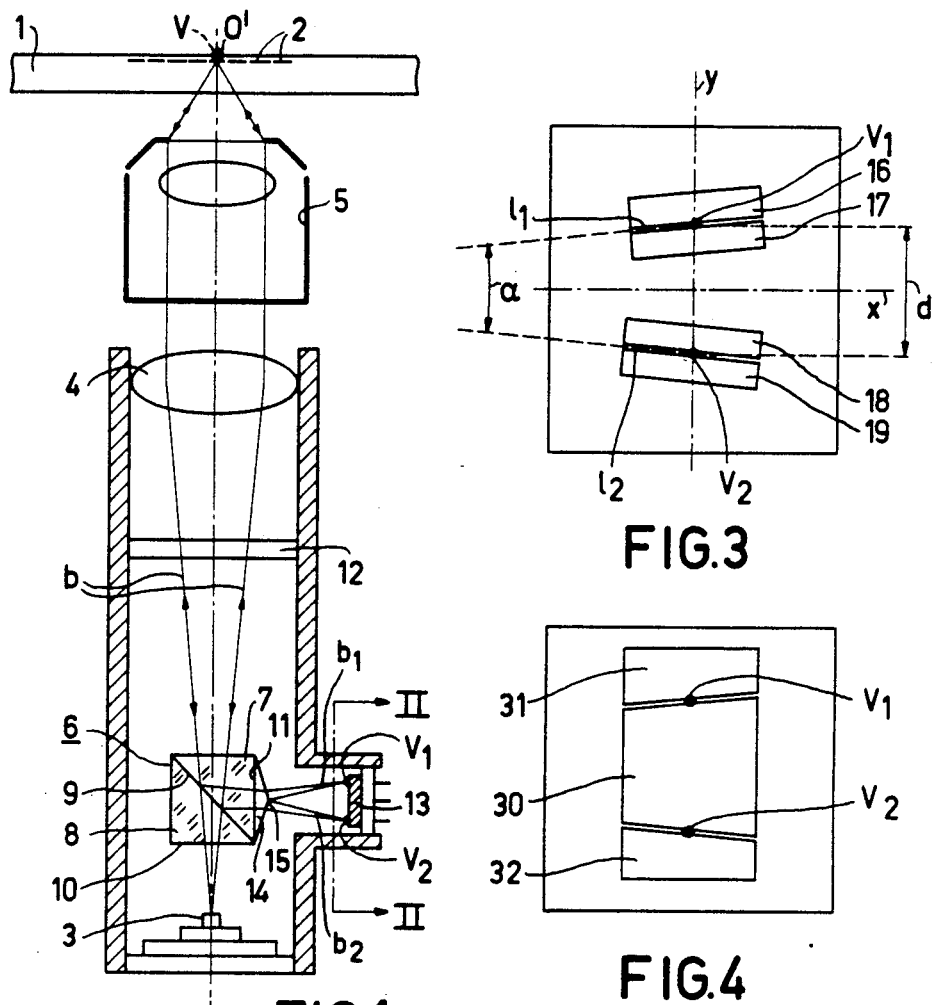

United States Patent [19]

van Alem

[11] Patent Number: 4,533,826

[45] Date of Patent: Aug. 6, 1985

[54] OPTO-ELECTRONIC FOCUSING-ERROR DETECTION DEVICE

[75] Inventor: Antonius A. M. van Alem, Eindhoven, Netherlands

[73] Assignee: U.S. Philips Corporation, New York, N.Y.

[21] Appl. No.: 411,734

[22] Filed: Aug. 26, 1982

[30] Foreign Application Priority Data

May 19, 1982 [NL] Netherlands .......................... 8202058

[51] Int. Cl.³ .............................................. G01J 1/20
[52] U.S. Cl. ......................................... 250/201; 369/45
[58] Field of Search ............... 250/201, 204, 216, 578, 250/209; 369/44, 45, 46

[56] References Cited

U.S. PATENT DOCUMENTS 4,425,636  1/1984  Musha et al. ........................ 369/45
4,450,547  5/1984  Nakamura et al. .................. 250/201

Primary Examiner—David C. Nelms
Attorney, Agent, or Firm—Robert T. Mayer; Algy Tamoshunas

[57] ABSTRACT

An optical focusing-error detection device comprises a beam splitter arranged in the path of a radiation beam originating from a plane on which is to be focused, and a radiation-sensitive detection system comprising a plurality of detectors separated by narrow strips, a first strip being associated with a first one and a second strip with the second one of two subbeams formed by the beam splitter. By arranging the two separating strips at an acute angle relative to each other it is possible to ensure that the centers of the radiation spots formed in the detector plane by the subbeams are disposed on the separating strips when focusing is correct.

6 Claims, 4 Drawing Figures

OPTO-ELECTRONIC FOCUSING-ERROR DETECTION DEVICE

The invention relates to an opto-electronic focusing-error detection device for detecting a deviation between a first radiation-reflecting surface and a plane of focusing of an objective system in optical imaging apparatus, in particular apparatus for reading a record carrier having an optical radiation-reflecting information structure or apparatus for optically recording information in a record carrier. A focusing-error detection device of this type comprises a beam-splitter arranged on the path of a radiation beam reflected by the first surface and a radition-sensitive detection system arranged behind the same beam-splitter and comprising a plurality of detectors which are separated from each other by narrow strips. A first separating strip is associated with a first and a second separating strip with a second, of two subbeams formed by the beam-splitter. The outputs of the detectors being connected to the inputs of an electronic circuit in which a focusing-error signal is derived from the detector signals.

Such a device is described in the article: "PCM-Schallplatte für die 80er Jahre", in "Radio Mentor" 45 (1979), pages 138–140. This device comprises a radiation source in the form of a semiconductor-diode laser. The read beam emitted by the laser is focused on an information structure of a disk-shaped record carrier by an objective system. The read beam which has been reflected by the information structure transverses the objective system a second time and subsequently passes through a beam-splitter prism arranged between the radiation source and the objective system. This prism diverts the modulated read beam from the radiation path of the beam emitted by the source, so that the modulated beam can be received by a radiation-sensitive detection system which supplies an electric signal in conformity with the modulation of the last-mentioned beam.

Optical systems which are used for imaging very small information details and which operate with a large numerical aperture have a small depth of focus. In such imaging systems, which are used in, for example, microscopes or apparatus for reading optical record carriers with very small details or apparatus for recording information on a record carrier, it is essential that a deviation between the actual and the desired plane of focusing can be detected in order to correct the focusing in response thereto. For this purpose, as is described in the aforementioned article, a roof prism may be arranged on the exit face of the beam-splitter prism. The roof prism splits the beam into two subbeams which are received by separate detectors of the radiation-sensitive detection system. This system comprises, for example, four radiation-sensitive detectors which are arranged along a line transverse to the refractive edge of the roof prism. Subtracting the sum of the signals from the two inner detectors from the sum of the signals from the two outer detectors yields a signal which is proportional to a focusing error.

In this focusing-error detection system the distance between the centres of the radiation spots formed in the plane of the detectors should be equal to the distance between the separating strips of the detectors and the radiation spots should be positioned correctly relative to the detectors, so that the radiation spots are disposed symmetrically relative to the associated separating strip when the beam is focused correctly. If the distance between the centres of the radiation spots is not correct and/or if the radiation spots are not positioned correctly, an erroneous focusing-error signal is obtained and correct focusing becomes impossible.

It is an object the present invention to arrange the detectors in such a way that after assembly of the focusing-error detection system, the distance between the centres of the radiation spots can be made equal to the distance between the separating strips and the position of the radiation spots can be corrected.

To this end the device, according to the invention, is characterized in that the first separating strip makes an acute angle with the second separating strip.

The desired object can be achieved by moving the two subbeams in one or two directions within the plane of the detectors when the beam is correctly in focus.

A preferred embodiment of the focusing-error detection system is further characterized in that the angle between the separating strips is substantially 22°.

By this choice of the angle it is achieved that even when the detector has limited dimensions the adjustment range is sufficiently large and the slope of the focusing-error detection system remains large.

An apparatus for reading and/or recording information in a radiation-reflecting information surface of a record carrier, which apparatus comprises a focusing-error detection device in accordance with the invention, is suitably characterized in that the detection device comprises four separate detectors, beam-splitting takes place in a plane which is effectively transverse to the track direction, and the electronic circuit comprises means for deriving a signal which provides an indication of the position, relative to an information track, of the radiation spot formed in the plane of the information surface.

Figure 3:
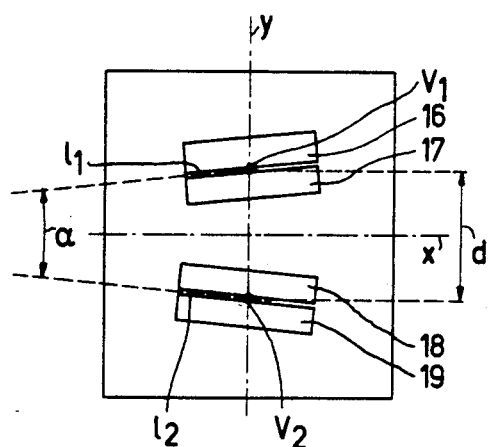
Figure 4:
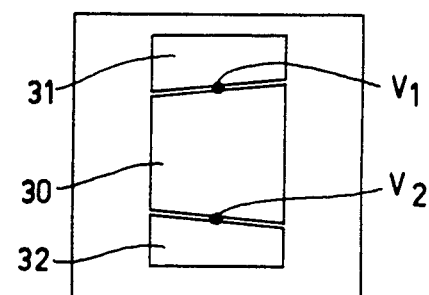
Figure 2:
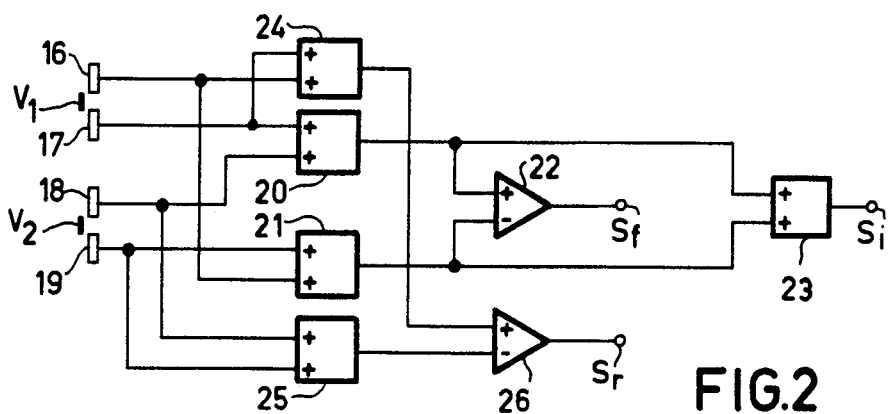

The invention will now be described in more detail, by way of example, with reference to the drawing, in which FIG. 1 shows an embodiment of an apparatus provided with the present focusing-error detection device, FIG. 2 shows the separate detectors and the electronic processing circuit, FIG. 3 shows a preferred embodiment of the detection device, and FIG. 4 shows a further embodiment of the detection device.

FIG. 1 shows a small part of a disk-shaped record carrier 1 in radial cross-section. The radiation-reflecting information structure is disposed on the upper side of the record carrier and comprises a multitude of information areas, not shown, arranged along information tracks 2. The information structure is scanned by a read beam b produced by a radiation source 3, for example a semiconductor-diode laser. A lens 4 forms the diverging beam into a parallel beam of such a cross-section that the pupil of an objective system 5 is filled adequately. This objective system then forms a radiation spot V of minimal dimensions on the information structure.

The read beam is reflected by the information structure and, as the record carrier moves relative to the read beam, the reflected beam is time-modulated in conformity with the information stored in the record carrier. In order to separate the modulated beam from the beam emitted by the radiation source, a beam-splitter prism 6 is arranged between the radiation source and the objective system. This prism may comprise two prismatic elements 7 and 8, between which a beam-splitting layer 9 is disposed. The entrance face and the exit face of the prism 6 are designated 10 and 11 respectively. The layer 9 may be a semitransparent layer. In order to minimize the loss of radiation in the read unit, a polarization-sensitive beam-splitting layer may be used. A λ/4 plate 12, λ being the wavelength of the read beam b, should then be arranged between the objective system and the prisms 6. The prism is traversed twice by the read beam and rotates the plane of polarization of this beam through 90° in total. The beam emitted by the radiation source is then transmitted almost completely by the prism, whereas the modulated beam is reflected almost completely, namely towards a radiation-sensitive detection system 13. This system supplies a signal which is modulated in accordance with the information stored in the record carrier.

In order to gerenate a focusing-error signal which provdes an indication of the magnitude and the direction of a deviation between the plane of focusing of the objective system and the plane of the information structure, a roof prism 14 is arranged on the exit face 11 of the beam-splitter prism 6. The radiation-sensitive detection system 13 comprises, for example, four radiation-sensitive detectors. In FIG. 2, which illustrates the focusing-error detection principle, these detectors are designated 16, 17, 18 and 19. This Figure is a view at the detectors taken along the line II—II' in FIG. 1. The refractive edge 15 of the prism 14 may be parallel to the optical axis 00' in FIG. 1, of the read unit. However, preferably, as is shown in FIG. 1, the roof prism is arranged in such a way that the refractive edge 15 is transverse to the optical axis 00'. This enables a tracking-error signal to be derived from the detector signals.

The roof prism splits the beam b into two subbeams $b_1$ and $b_2$ which co-operate with the detectors 16, 17 and the detectos 18, 19 respectively.

FIGS. 1 and 2 show the situation in which the read beam is focused exactly in the plane of the information structure. The read unit may be constructed so that the focus of the reflected beam is disposed exactly in the plane of the detectors. In the case of a correct focusing the subbeams $b_1$ and $b_2$ are symmetrically incident on their associated detectors 16, 17 and 18, 19 respectively. In the case of a focusing error the energy distribution within the subbeam $b_1$ and $b_2$ respectively relative to the associated detectors changes, which may be regarded as a displacement of the radiation spots $V_1$ and $V_2$ formed by the subbeams relative to the detectors. If the focus of the beam emitted by the radiation source is disposed above the plane of the information structure, the beams $b_1$ and $b_2$ are moved inwards and the detectors 16 and 19 receive less radiation energy than the detectors 17 and 18. If the focus of the read beam emitted by the radiation source is disposed below the plane of the information structure the reverse happens and the detectors 17 and 18 receive less radiation energy than the detectors 16 and 19. As shown in FIG. 2, by applying the signals from the detectors 17 and 18 to a first adder 20 and those from the detectors 16 and 19 to a second adder 21 and applying the signals from these adders to a differential amplifier 22, a focusing-error signal $S_f$ is obtained. The information signal $S_i$ can be obtained by means of a third adder 23, whose inputs are connected to the adders 20 and 21.

Either the base, as is shown in FIG. 1, or the refractive edge 15 of the roof prism 14 may be disposed on the exit face 11 of the beam-splitter prism. For the selected large value of the apex angle of the roof prism, for example approximately 170°, the prism 14 will have substantially the same effect in either case. The apex angle is selected to be as large as possible in order to ensure that the detection elements can be arranged as close as possible to each other and can be constructed as one integrated detector.

The focusing-error signal is determined by the position of the centre of the radiation spot $V_1$, or $V_2$ relative to the separation strip of the detectors 16 and 17 and the separating strip of the detectors 18 and 19 respectively. Care must be taken that when the beam $b_1$ is cirrectly focused the distance between the centre of the radiation spot is equal to the distance between the separating strips. Because of varying tolerances in the optical elements of the focusing-error detection device, deviations in the distance between the radiation spots may occur. If the distance between the radiation spots is too large, said radiation spots have shifted outwards relative to the detectors even in the case of a correct focusing, so that a positive focusing-error signal will be supplied. If the distance between the radiation spots is too small, a negative focusing-error signal will be supplied.

In order to permit the distance between the centres of the detectors pairs 16, 17 and 18, 19 to be adapted to the distance between the centres of the radiation spots upon assembly of the device, the detector system is constructed as shown in FIG. 3. The detector pairs are no longer arranged parallel to each other, but in such a way that the separating strip $l_1$ of the detectors 16 and 17 makes an acute angle α with the separating strip $l_2$ of the detectors 18 and 19. In FIG. 3 two radiation spots $V_1$ and $V_2$ are shown. The spots are spaced from each other by a distance d which corresponds to the distance between the separating strips measured along the line y through the centre of the detector system. If the distance between the radiation spots $V_1$ and $V_2$ is greater than d, the subbeams $b_1$ and $b_2$ should be shifted in such a way that the radiation spots $V_1$ and $V_2$ are moved to the right until the centres of the radiation spots are disposed exactly on the separation strips. If the distance between the centres of the radiation spots is too small, they should be shifted to the left.

For the adjustment of the read unit upon assembly and for correct adjustment of the focus of an objective system, the positions of the radiation spots $V_1$ and $V_2$ relative to the detectors are determined by measuring the detector signals. By means of this measurement, the positions of the radiation spots may be corrected, for example, by displacing and/or by tilting the prism 6, in such a way that the centres of the radiation spots are disposed on the separating strips $l_1$ and $l_2$.

The sensitivity of the focusing-error detection device is optimal if the strips $l_1$ and $l_2$ extend in the x-direction, i.e. extend transversely of the direction y in which the radiation spots $V_1$ and $V_2$ move in the case of focusing errors. If an angle α of the order of 22° is selected, then, although the dimensions of the detectors are limited, the distance between the separating strips can be adapted satisfactorily to the distance between the radiation spots $V_1$ and $V_2$, whilst the sensitivity to focusing errors remains great enough.

By arranging the refractive edge 15 of the prism 14 transversely to the optical axis 00', as is shown in FIG. 1, the radiation spots $V_1$ and $V_2$ are shifted relative to each other in a direction which is effectively transverse to the track direction. In this case it is possible to derive a signal which provides an indication of the position of the read spot V relative to the centre of a track to be read from the signals supplied by the four detectors 16, 17, 18 and 19. As is shown in FIG. 2, this signal, $S_r$, is obtained by applying the signals from the detectors 16 and 17 to a summing device 24 and those from the detectors 18 and 19 to a summing device 2 and by applying the signals from the summing devices to a differential amplifier 26. Consequently, the signal $S_r$ is given by:

$$S_r = (S_{16} + S_{17}) - (S_{18} + S_{19}).$$

If the detection system 13 is not used for generating a tracking signal $S_r$, this system may comprise only three detectors, as is shown in FIG. 4. The strip $l_1$ separating the detectors 31 and 30 and the strip $l_2$ separating the detectors 32 and 30 again make an acute angle with each other. The focusing-error signal $S_f$ is given by:

$$S_f = (S_{31} + S_{32}) - S_{30}.$$

The invention has been described for use in conjunction with an optical read unit, but may alternatively be employed in a write unit or in a combined read-write unit. The write unit is of a construction similar to the read unit described above. For recording of information, for example, by melting pits into a metallic layer, more energy is required than for reading and, moreover, the write beam should be time-modulated in accordance with the information to be recorded. As radiation source in the write unit, a gas laser, such as HeNe laser, may be used, whilst a modulator, such as an electro-optical or acousto-optical modulator, should be arranged in the path of the write beam. Alternatively, a diode laser may be used, the write beam being modulated by varying the current through the diode laser, so that no separate modulator is required.

The focusing-error detection device described does not employ special properties of the optical information structure or of the surface on which it is to be focused. The only requirement is that this surface is radiation-reflecting. The focusing-error detection device may therefore be used in various aparatuses which require a very accurate focusing, for example in microscopes.

What is claimed is:

1. A focusing error detection device for detecting deviation between a radiation-reflecting surface and a plane of focusing of an objective system arranged to converge a beam of radiation to a spot on said reflecting surface, said device comprising a beam splitter disposed in the path of radiation reflected by said surface, said beam splitter being arranged so as to form a pair of subbeams from the reflected radiation incident thereon, a detection system disposed in the path of said subbeams, said detection system comprising a plurality of radiation sensitive detectors each having an output for supplying an electrical signal, said detectors being separated from each other by a first and second elongated strip, said first elongated strip being associated with one of said subbeams and being inclined at an acute angle with respect to said second strip which is associated with the other subbeam of said pair of subbeams, and an electronic circuit coupled to said outputs of said detectors for deriving a focusing error signal indicative of the deviation between said radiation-reflecting surface and said plane of focusing from said electrical signals supplied by said detectors.

2. The focus error detection device according to claim 1 wherein said angle between said strips is substantially 22°.

3. An apparatus for reading and/or recording information in elongated tracks on a radiation-reflecting surface of a record carrier, said apparatus comprising means for producing a beam of radiation, an objective system for converging said beam to a radiation spot on said reflecting surface, means disposed in the path of radiation reflected by said reflective surface for splitting said reflected radiation into a pair of subbeams, and means for detecting deviation between said reflecting surface and a plane of focusing of said objective system, said detecting means comprising a plurality of radiation sensitive detectors disposed in the path of said subbeams, said detectors being separated from each other by a first and second elongated strip, said first strip being associated with one of said subbeams and being inclined at an acute angle with respect to said second strip which is associated with the other subbeam of said pair of subbeams, said detectors each having an output for supplying an electrical signal, and means coupled to said outputs for deriving from said electrical signals a focus error signal indicative of said deviation between said reflecting surface and said plane of focusing.

4. The apparatus according to claim 3 wherein said detecting means includes four of said detectors and said beam splitting takes place in a plane which is effectively transverse to the track direction, and wherein said deriving means includes further means for deriving from said electrical signals a further signal indicative of the position of said radiation spot relative to a given track.

5. Apparatus according to claim 3 or 4 wherein said objective system is arranged relative to said reflecting surface so that said surface reflects the radiation incident thereon back through said objective system and along at least a portion of the path traversed by incident radiation travelling towards said reflecting surface, and including means disposed in said path portion for separating said reflected radiation from said incident radiation and directing said reflected radiation along a second path, said splitting means being disposed in said second path between said separating means and said detectors.

6. The apparatus according to claim 4 wherein said objective system has an optical axis which is generally perpendicular to said reflective surface, said separating means being arranged so that said second path is generally perpendicular to said optical axis, and wherein said splitting means includes a roof prism having a refractive edge which extends in a direction transverse to said optical axis.

* * * * *